(12) United States Patent
Baeta et al.

(10) Patent No.: US 9,381,713 B2
(45) Date of Patent: Jul. 5, 2016

(54) MACHINE FOR MANUFACTURING MULTI-LAYER PRICE TAGS AND METHOD OF USING THE SAME

(75) Inventors: Jordi Baeta, Barcelona (ES); Stefano Lacaita, Ft. Lauderdale, FL (US)

(73) Assignee: Avery Dennison Corporation, Glendale, CA (US)

( * ) Notice: Subject to any disclaimer, the term of this patent is extended or adjusted under 35 U.S.C. 154(b) by 451 days.

(21) Appl. No.: 12/856,215

(22) Filed: Aug. 13, 2010

(65) Prior Publication Data

US 2012/0037299 A1    Feb. 16, 2012

(51) Int. Cl.
| | | |
|---|---|---|
| G09F 3/02 | (2006.01) | |
| B31D 1/02 | (2006.01) | |
| B32B 38/14 | (2006.01) | |
| B41J 3/407 | (2006.01) | |
| B65C 11/02 | (2006.01) | |
| B65C 9/18 | (2006.01) | |

(52) U.S. Cl.
CPC .............. B31D 1/021 (2013.01); B32B 38/14 (2013.01); B41J 3/4075 (2013.01); G09F 3/02 (2013.01); *B65C 2009/1888* (2013.01); *G09F 2003/0202* (2013.01); *G09F 2003/0241* (2013.01); *G09F 2003/0257* (2013.01); *Y10T 156/1052* (2015.01)

(58) Field of Classification Search
CPC ....... B31D 1/021; B42D 15/10; B41J 3/4075; G09F 3/02; G09F 3/10; Y10T 156/1052; Y10T 156/1084; Y10T 156/1089; B32B 38/14; B41M 7/0027; B65C 11/0247; B65C 2210/0075; B65C 2210/0059; B65C 11/021; B65C 11/0289; B65C 9/46; B65C 9/1865; B65C 9/1826

USPC .................................................. 156/277, 384
See application file for complete search history.

(56) References Cited

U.S. PATENT DOCUMENTS

| | | | | |
|---|---|---|---|---|
| 4,281,762 A | * | 8/1981 | Hattemer | 206/390 |
| 4,439,257 A | * | 3/1984 | Sato et al. | 156/64 |

(Continued)

FOREIGN PATENT DOCUMENTS

| | | |
|---|---|---|
| CN | 101055325 | 10/2007 |
| CN | 101223568 | 7/2008 |

(Continued)

OTHER PUBLICATIONS

English translation of CN201211737Y—Mar. 25, 2009.*

(Continued)

*Primary Examiner* — Sonya Mazumdar
(74) *Attorney, Agent, or Firm* — Avery Dennison Retail Information Services, LLC

(57) ABSTRACT

A machine for creating multi-layer price tags. The machine has a proximal end and a distal end. The machine further has a base. A frame is attached to the base toward the distal end of the machine. A secondary frame is attached to the base toward the proximal end of the machine. An unwinder is mounted to the frame toward the distal end of the machine. At least two printers are mounted to the frame, and at least one automated label applicator is mounted between the at least two printers. A rewinder is mounted to the secondary frame. The at least two printers are preferably thermal transfer printheads. The automated label applicator preferably utilizes either a low-stick or non-stick adhesive. In an alternative embodiment of the machine, the rewinder is replaced by an automated label applicator mounted to the secondary frame.

20 Claims, 5 Drawing Sheets

(56) References Cited

U.S. PATENT DOCUMENTS

| | | | |
|---|---|---|---|
| 4,526,405 A * | 7/1985 | Hattemer | 283/81 |
| 5,149,211 A * | 9/1992 | Pettigrew et al. | 400/88 |
| 5,284,363 A * | 2/1994 | Gartner | G09F 3/10 283/101 |
| 5,738,381 A * | 4/1998 | Treleaven et al. | 283/81 |
| 5,782,495 A * | 7/1998 | Grosskopf et al. | 283/81 |
| 6,508,904 B1 * | 1/2003 | Charley | 156/249 |
| 6,542,622 B1 * | 4/2003 | Nelson et al. | 382/112 |
| 6,576,315 B2 * | 6/2003 | Treleaven et al. | 428/40.1 |
| 7,018,502 B2 * | 3/2006 | Treleaven et al. | 156/269 |
| 7,021,214 B2 * | 4/2006 | Kugo et al. | 101/485 |
| 7,875,142 B2 * | 1/2011 | Matthews et al. | 156/156 |
| 2001/0052386 A1 | 12/2001 | Treleaven et al. | |
| 2006/0082637 A1 * | 4/2006 | Sanbongi et al. | 347/213 |
| 2006/0233995 A1 * | 10/2006 | Garland | B31D 1/021 428/41.8 |
| 2007/0252704 A1 * | 11/2007 | Nagae | G06K 19/041 340/572.8 |

FOREIGN PATENT DOCUMENTS

| | | | |
|---|---|---|---|
| CN | 201211737 | 3/2009 | |
| CN | 201211737 Y * | 3/2009 | B41J 2/325 |
| GB | 2133343 | 7/1984 | |
| GB | 2133343 A * | 7/1984 | B31D 1/021 |

OTHER PUBLICATIONS

International Search Report dated Jan. 25, 2012 for Application PCT/US2011/047755 filed Aug. 15, 2011.
Written Opinion dated Jan. 25, 2012 for Application PCT/US2011/047755 filed Aug. 15, 2011.
European Search Report dated Nov. 20, 2013 from corresponding European Application No. 13004697.
State Intellectual Property Office of PRC Notification of First Office Action dated Feb. 8, 2014 for Application No. 201180043600.0.
State Intellectual Property Office of PRC Notification of Second Office Action dated Dec. 29, 2014 for Application No. 201180043600.0.

* cited by examiner

MACHINE FOR MANUFACTURING MULTI-LAYER PRICE TAGS AND METHOD OF USING THE SAME

FIELD OF THE INVENTION

A machine for manufacturing a multi-layer price tag. More particularly, the present invention relates to a machine for manufacturing a multi-layer price tag in a continuous and efficient manner utilizing a combination of thermals transfer printers and automated label applicators. In an exemplary embodiment of the present invention, the machine is able to manufacture a multi-layer price tag roll. In an alternative embodiment of the present invention, the machine is able to manufacture a plurality of individual multi-layer price tags.

BACKGROUND OF THE INVENTION

Price tags are commonly used by the retail industry to provide information relating to the merchandise the price tags are attached to. Such information may include the price and Universal Product Code of the merchandise, the manufacturer of the merchandise, merchandise care instructions, and merchandise rebate or registration information.

Typically, merchandise is priced differently depending on where the merchandise is sold. For example, stores in Northern Europe will typically have prices higher than that of those in Southern Europe, despite the fact that all countries in Europe have adopted the Euro.

To combat this issue, stores have resorted to double price tags having a perforation separating two price tags, with each separate price tag having a different price. However this approach presents a couple of issues. First, a worker separating the double price tag must take extra care not to damage the price tag as he or she separates the price tag along the perforation. Although the perforation in the double price tag assists the worker in making a relatively clean tear, there still exists a chance that the double price tag will tear outside the perforation, thus necessitating the worker to attach a new double price tag to the merchandise and again attempt to cleanly tear the new double price tag along the perforation. Second, the tearing of the double price tag along the perforation does not necessarily lend to the tidiest appearance. Even if a worker takes extra care to cleanly tear the double price tag along the perforation, the perforated edge still appears ragged, and thus unsightly.

Another problem similar to the one presented above in regards to the multiple pricing system found in Europe relates to seasonal merchandise and trend setting merchandise. Typically, this type of merchandise has a very limited sellable "shelf life". Once the season has changed, or the fashion world has moved on to another trend, the merchandise must be marked down to a lower price point in order for the merchandise to be cleared from the sales floor to make room for the new fashion trend and/or the new season of merchandise.

Retail stores typically utilize "pricing guns" to mark down the price of merchandise. However, this approach also presents several issues. First, there exists a risk that customers may peel of the marked down price and place that marked down price on a higher priced item. Second, the retail store must keep additional supplies on hand in the store specifically for the purpose of operating the pricing gun. Such supplies may include extra pricing gun parts to repair a broken pricing gun, rolls of price tags for the pricing gun to mark the lower price on, and ink cartridges to allow the pricing gun to mark the price tags. These additional supplies may clutter the retail store, or maybe become lost, thereby rendering the pricing gun nonfunctional. Third, the use of tagging guns leads to an unsightly appearance of the merchandise. The price tags created by the tagging guns rarely mimics the appearance of the price tag provided by the merchandise manufacturer. Accordingly, once a price tag created by a tagging gun is applied to the price tag provided the merchandise manufacturer, the manufacturer's price tag may become cluttered looking.

Therefore, what is needed is an improved price tag and a method of manufacturing the improved price tag.

BRIEF SUMMARY OF THE INVENTION

By providing a multi-layer price tag and a machine for manufacturing the multi-layer price tag, the present invention overcomes the above enumerated problems.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to a machine for manufacturing multi-layer price tags. The machine has a proximal end and a distal end. The machine further has a base. A frame is attached to the base toward the distal end of the machine. A secondary frame is attached to the base toward the proximal end of the machine. An unwinder is mounted to the frame toward the distal end of the machine. At least two printers are mounted to the frame, and at least one automated label applicator is mounted between the at least two printers. A rewinder is mounted to the secondary frame. The at least two printers are preferably thermal transfer printheads. The automated label applicator preferably utilizes either a low-stick or a non-stick adhesive. In an alternative embodiment of the machine, the rewinder is replaced by an automated label applicator mounted to the secondary frame.

The present invention also relates to a method of manufacturing a multi-layer price tag roll. The method begins with the step of providing a machine having a base, a frame, a secondary frame, an unwinder, at least two printers, at least one automated label applicator, and a rewinder. Next, the method includes the step of providing a plurality of base layer labels on a base label roll and mounting the base label roll to the unwinder. Then, unwinding the base label roll from the unwinder to create a base label web. Next, one of the at least two printers prints a first information layer on the base label web to create a printed one-layer price tag web. Then, the method includes the step of applying a second layer of labels to the printed one-layer price tag web using the at least one automated label applicator to create an unprinted two-layer price tag web. Next, another one of the at least two printers prints a second information layer on the unprinted two-layer price tag web to create a completed multi-layer price tag web. Finally, the method concludes with the step of rewinding the completed multi-layer price tag web on the rewinder to create a multi-layer price tag roll.

The present invention also relates to a method of manufacturing a plurality of multi-layer price tags. The method begins with the step of providing a machine having a base, a frame, a secondary frame, an unwinder, at least two printers, at least one automated label applicator, and an automated price tag cutter. Next, the method includes the step of providing a plurality of base layer labels on a base label roll and mounting the base label roll to the unwinder. Then, unwinding the base label roll from the unwinder to create a base label web. Next, one of the at least two printers prints a first information layer on the base label web to create a printed one-layer price tag web. Then, the method includes the step of applying a second layer of labels to the printed one-layer price tag web using the at least one automated label applicator to create an unprinted two-layer price tag web. Next, another one of the at least two printers prints a second information layer on the unprinted two-layer price tag web to create a completed multi-layer price tag web. Finally, the method concludes with the step separating the completed multi-layer price tag web using the automated price tag cutter to create a plurality of multi-layer price tags.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Figure 1:
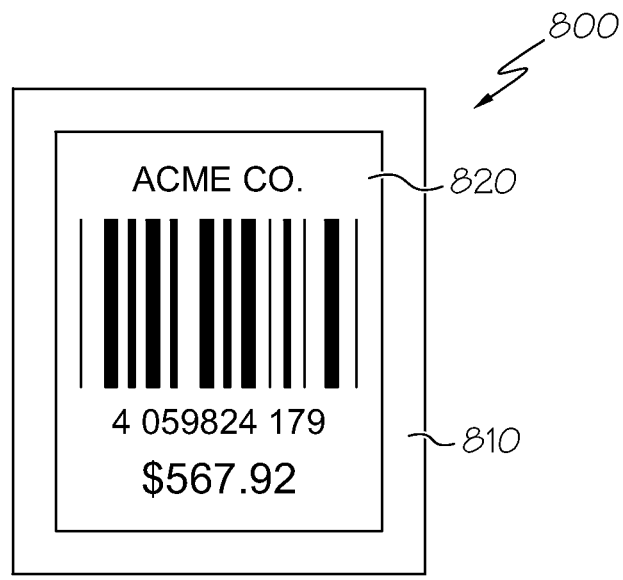
FIG. 1 is a top view of a two-layer price tag manufactured by an exemplary embodiment of the machine of the present invention.
Figure 2:
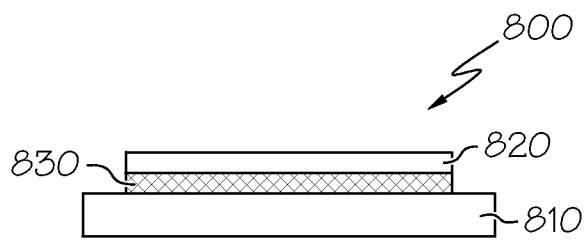
FIG. 2 is a magnified side view of the removable two-layer price tag shown in FIG. 1.

Referring now to FIGS. 1 and 2, a two-layer price tag 800 is shown. The two-layer price tag 800 has a base layer 810 and a secondary layer 820. The secondary layer 820 is held to the base layer 810 by a low-stick/non-stick adhesive layer 830. Examples of suitable low-stick/non-stick adhesives for the adhesive layer 830 include, but are not limited to, removable adhesives, repositionable adhesives, low tack adhesives, frangible adhesives, and static adhesives. Preferably, the adhesive layer 830 will lose it's adhesive qualities after the secondary layer 820 is removed from the base layer 810 so as to prevent unscrupulous customers from removing a secondary layer from a price tag of a lower priced item and placing that secondary layer on a higher priced item. As illustrated in FIGS. 1 and 2, it is contemplated that the secondary layer 820 may have dimensions slightly smaller than that of the base layer 810 to improve the application accuracy of the secondary layer 820 to the base layer 810.

In use, the base layer 810 is printed with information relating to a higher price, while the secondary layer 820 is printed with information relating to a lower price. When the two-layer price tag 800 is attached to merchandise that is delivered to an area with a lower pricing scheme, the secondary layer 820 remains on the two-layer price tag 800. If the merchandise is delivered to an area with a higher pricing scheme, the secondary layer 820 is easily peeled off to reveal the base layer 810 containing the higher price information. Similarly, when seasonal or trend setting merchandise is initially displayed, the secondary layer 820 remains on the two-layer price tag 800 to display the normal price information. Once the merchandise is out of season or is no longer in style, the secondary layer 820 can easily be removed to reveal the base layer 810. The process of peeling away the secondary layer 820 from the base layer 810 is much easier, faster, and neater than separating a perforated double price tag or using a pricing gun to apply a marked down price tag.

Figure 2A:
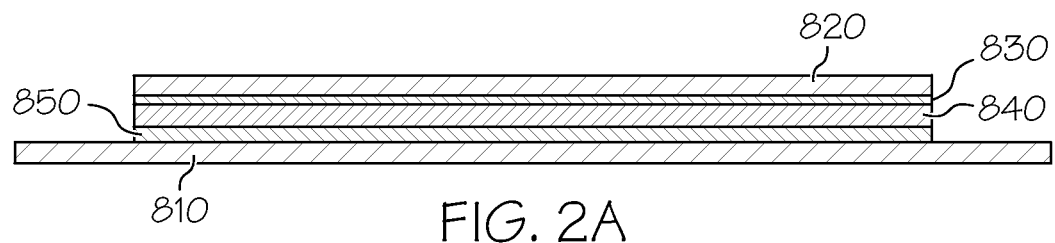
FIG. 2A is a cross sectional view of the non-stick two-layer price tag shown in FIG. 1.

Similarly with respect to FIG. 2A which shows a non-stick version of the price tag of FIG. 1, 820 is the face stock, 830 the static adhesive, 840 is the synthetic layer, 850 a permanent adhesive and 810 the base layer. The material is available from Avery Dennison Corporation of Pasadena, Calif. To have the non-stick behavior, the construction is made of a face stock and synthetic layer having adhesive and a static or frangible adhesive which provides a "one-use" function. The laminate is applied to the surface with permanent adhesive. When the stock layer 820 is peeled off, the synthetic layer 840 remains over the layers providing a clear, brilliant finish.

Figure 3:
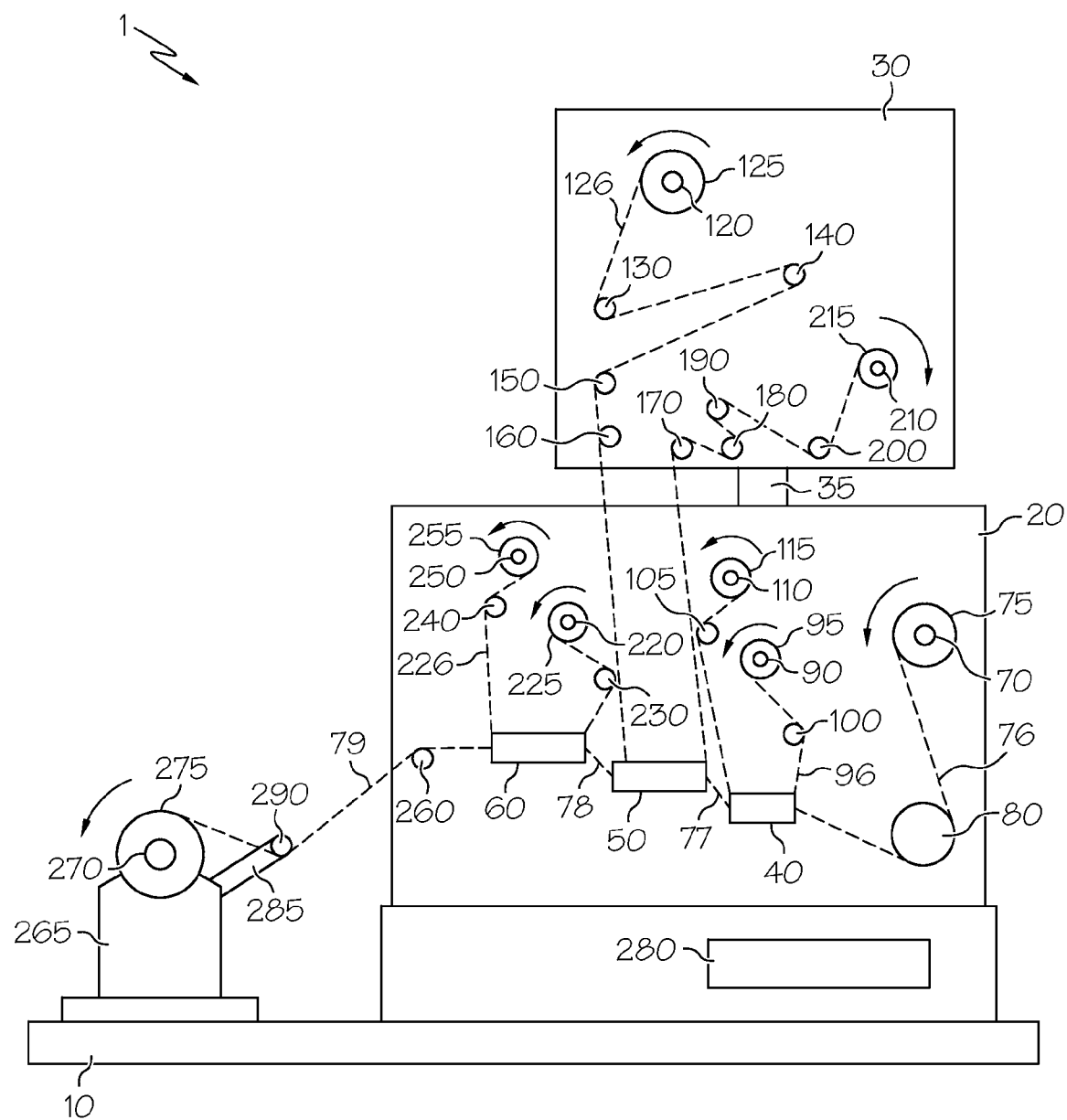
FIG. 3 is a front view of the exemplary embodiment of a machine for manufacturing a multi-layer price tag in accordance with the present invention.

Referring now to FIG. 3, an exemplary embodiment of a machine 1 for manufacturing the two-layer price tag 800 is shown. The machine 1 has a proximal end 5 and a distal end 6. It should be noted that portions of the machine 1 not pertinent to the present invention are neither shown nor described in detail herein.

The machine 1 has a base 10. A lower frame 20 is attached to the base 10 toward the distal end 6 of the machine 1. A support rod 35 is connected to the base 10 behind the lower frame 20 by a screw allowing the upper frame 30 to move right/left in order to position the dispensed label accurately onto the first layer in a horizontal sense. The support rod 35 suspends an upper frame 30 directly above the lower frame 20. A secondary frame 265 is attached to the base 10 toward the proximal end 5 of the machine 1. A user interface 280 is integrated into the front of the lower frame 10.

A base label unwinder 70 is mounted near the top of the lower frame 20 toward the distal end 6 of the machine 1. A first label idler 80 is mounted to the lower frame 20 below the base label unwinder 70. A first thermal transfer printhead 40 is mounted to the lower frame 20 to the left of the first label idler 80. The first thermal transfer printhead 40 is provided with a first thermal material (thermal foil, paper, etc.) unwinder 90 and a first thermal web rewinder 110. The first thermal web unwinder 90 and the first thermal web rewinder 110 are mounted to the lower frame 20 above the first thermal transfer printhead 40. The first thermal transfer printhead 40 is further provided with a first thermal web idler 100 and a second thermal web idler 105. The first thermal web idler 100 is positioned between the first thermal transfer printhead 40 and the first thermal web unwinder 90 toward the distal end 6 of the machine 1. The second thermal web idler 105 is positioned between the first thermal web unwinder 90 and the first thermal web rewinder 110 toward the proximal end 5 of the machine 1.

An automated label applicator 50 is mounted to the lower frame 20 to the left of the first thermal transfer printhead 40. The automated label applicator 50 is provided with a second label unwinder 120 and a second label rewinder 210. The second label unwinder 120 is mounted to the upper frame 30 toward the proximal end 5 of the machine, while the second label rewinder 210 is mounted to the upper frame 30 toward the distal end 6 of the machine 1. The automated label applicator 50 is further provided with a plurality of eight automated label applicator idlers 130, 140, 150, 160, 170, 180, 190, 200. The first and second automated label applicator idlers 130, 140 are mounted on the upper frame 30 and are positioned near the periphery of the second label unwinder 120. The third and fourth automated label applicator idlers 150, 160 are likewise mounted on the upper frame 30. The third automated label applicator idler 150 is positioned below the first automated label applicator idler 130. The fourth automated label applicator idler 160 is mounted below the third automated label applicator idler 150. The fifth, sixth, and seventh automated label applicator idlers 170, 180, 190 are mounted on the upper frame 30 and are arranged in a substantially triangular formation to the right of the third and fourth automated label applicator idlers 150, 160. The eighth automated label applicator idler 200 is mounted to the upper frame 30, and is positioned near the periphery of the second label rewinder 210.

A second thermal transfer printhead 60 is mounted to the lower frame 20 to the left of the automated label applicator 50. The second thermal transfer printhead 60 is provided with a second thermal web unwinder 220 and a second thermal web rewinder 250. The second thermal web unwinder 220 and the second thermal web rewinder 250 are mounted to the lower frame 20 above the second thermal transfer printhead 60. The second thermal transfer printhead 60 is further provided with a third thermal web idler 230 and a fourth thermal web idler 240. The third thermal web idler 230 is positioned between the second thermal transfer printhead 60 and the second thermal web rewinder 250 toward the distal end 6 of the machine 1. The fourth thermal web idler 240 is positioned between the second thermal web unwinder 220 and the second thermal web rewinder 250 toward the proximal end 5 of the machine 1.

The machine 1 further has a secondary frame 265 mounted to the base 10. The secondary frame 265 is located a short distance away from the lower frame 20 toward the proximal end 5 of the machine 1. A second label idler 260 is mounted to the lower frame 20 and is positioned between the secondary frame 265 and the second thermal transfer printhead 60. A completed product rewinder 270 is mounted on the secondary frame 265. The completed product rewinder 270 is provided with a third label idler 290. The third label idler 290 is mounted near the periphery of the completed product rewinder 270 by a third label idler arm 285 that extends from the secondary frame 265.

Having now described the layout of the machine 1 for manufacturing a two-layer price tag, the operation of the machine 1 will now be explained. The machine 1 must first be prepped before it is operated. To prep the machine 1, an operator first loads the machine 1 by loading the base label unwinder 70 with a base layer roll 75, the first thermal web unwinder 90 with a first unused thermal material roll 95, the second label unwinder 120 with an unused second label roll 125, and the second thermal web unwinder 220 with a second unused thermal material roll 225. The base layer roll 75 consists of a plurality of continuous base layer price tags. The unused second label roll 125 consists of a plurality of continuous second label price tags.

Once the machine 1 is loaded, the operator then feeds each of the aforementioned rolls through the appropriate parts of the machine 1 such that each of the aforementioned rolls is directed through the machine 1 in the following manner. The base layer roll 75 is unwound counterclockwise from the base label unwinder 70 to create a base layer web 76. The base layer web 76 is directed downwards away from the base label unwinder 70 by the first label idler 80. The base layer web 76 moves clockwise around the first label idler 80, and then travels away from the distal end 6 of the machine 1 and toward the proximal end 5. As the base layer web 76 travels toward the proximal end 5 of the machine 1, the base layer web 76 moves through the first thermal transfer printhead 40, the automated label applicator 50, and finally the second thermal transfer printhead 60. Upon exiting from the second thermal transfer printhead 60, the base layer web 76 moves counterclockwise around the second label idler 260 and clockwise around the third label idler 290 before finally being wound clockwise onto the completed product rewinder 270. The labels are wound clockwise to prevent the labels from inadvertently peeling off the roll.

The first unused thermal ink foil roll 95 (other thermal materials may also be suitable) is unwound counterclockwise from the first thermal ink foil unwinder 90 to form a first thermal ink foil web 96. The first thermal web 96 moves clockwise around the first thermal web idler 100 before entering the first thermal transfer printhead 40. Upon exiting the first thermal transfer printhead 40, the first thermal web 96 moves clockwise around the second thermal web idler 105 before being wound counterclockwise onto the first thermal web rewinder 110. Winding the first thermal web 96 onto the first thermal web rewinder 110 creates a first used thermal roll 115. The second unused thermal material roll 225 likewise unwinds counterclockwise from the second thermal web unwinder 220 to form a second thermal web 226. The second thermal web 226 moves clockwise around the third thermal web idler 230 and into the second thermal transfer printhead 60. The second thermal web 226 exits from the second thermal transfer printhead 60 and moves clockwise around the fourth thermal web idler 240. Finally, the second thermal web 226 is wound counterclockwise onto the second thermal web rewinder 110 to form a second used thermal web roll 255.

The unused second label roll 125 is unwound counterclockwise from the second label unwinder 120 to form a second label web 126. The second label web 126 is directed downwards by the first automated label applicator idler 130. The second label web 126 travels counterclockwise around the first automated label applicator idler 130, and then moves toward the distal end 6 of the machine 1 and to the second automated label applicator idler 140. After traveling clockwise around the second automated label applicator idler 140, the second label web 126 returns toward the proximal end 5 of the machine 1 to move counterclockwise around the third automated label applicator idler 150 before heading downward toward the fourth automated label applicator idler 160. The second label web 126 then moves counterclockwise around the fourth automated label applicator idler 160 before entering into the automated label applicator 50. Upon exiting the automated label applicator 50 the second label web 126 is directed upward and rotates clockwise around the fifth automated label applicator idler 170. The second label web 126 then moves counterclockwise around the sixth automated label applicator idler 180, and clockwise around the seventh automated label applicator idler 190. Finally, the second label web 126 moves counterclockwise around the eighth automated label applicator idler 200 before being wound clockwise onto the second label rewinder 210 to form a used second label roll 215.

With the machine 1 now prepped, the manufacture of two-layer price tags can begin. To begin operation of the machine 1, the operator inputs data pertaining to the merchandise that the two-layer price tags will be attached to via the user interface 280. The machine includes an electronic board (EB). The EB communicates with an external data device, such as a computer, which provide variable data to the machine. The EB processes the variable data and sends it to the different printheads in order to have the appropriate print or indicia appear on each layer. Such data may include, but is not limited to, the Universal Product Code barcode of the merchandise, the Universal Product Code number of the merchandise, the merchandise price, the name of the manufacturer of the merchandise, and the merchandise size. Using the user interface 280, the operator may also adjust various parameters relating to the operation of the machine 1, such as the overall production requirements and the production rates of the two-layer price tags.

It is contemplated that the user interface 280 may also alert the operator to various events regarding the operating status of the machine 1. For example, the user interface 280 may alert the operator that the supply of one of the aforementioned rolls is running low or has been exhausted. Additionally, the user interface 280 may alert the operator that the requested production requirement has been satisfied, or that the machine 1 has encountered an operating error. The alert may come in the form of an audio warning, a visual warning, or a combination of both.

Once the operator has inputted the requisite data, the operator can use the user interface 280 to command the machine 1 to begin manufacture of the two-layer price tags. The two-layer price tags begin production as a plurality of continuous one-layer price tags on the base layer roll 75. As explained above, the base layer roll 75 unwinds from the base label unwinder 70 to create a base layer web 76. The base layer web 76 moves through the machine 1 to the first thermal transfer printhead 40. The first thermal transfer printhead 40 is provided with a print medium in the form of the first thermal web 96. The first thermal web 96 is provided from the first unused thermal web roll 95 that has been unwound from the first thermal web unwinder 90. As the base layer web 76 moves through the first thermal transfer printhead 40, the first thermal transfer printhead 40 uses the provided first thermal web 96 to print the data inputted by the operator onto the base layer web 76. The first thermal web 96 exits the first thermal transfer printhead 40 and is collected on the first thermal web rewinder 110 as the first used thermal material roll 115. The base layer web 76 exits from the first thermal transfer printhead 40 as a printed one-layer price tag web 77 and continues through the machine 1 to the automated label applicator 50.

The automated label applicator 50 is provided with a plurality of second layer labels in the form of the second label web 126. Unwinding the unused second label roll 125 from the second label unwinder 120 creates the second label web 126. The automated label applicator 50 removes the plurality of second layer labels from the second label web 126 and applies the second layer labels to the printed one-layer price tag web 77 as the printed one-layer price tag web 77 moves through the automated label applicator 50 to create an unprinted two-layer price tag web 78. The used second label web exits 126 from the automated label applicator and is collected on the second label rewinder 210 as the used second label roll 215. The unprinted two-layer price tag web 77 moves through the machine 1 to the second thermal transfer printhead 60.

Similar to the first thermal transfer printhead 40, the second thermal transfer printhead 60 is provided with a second thermal web 226 for a print medium. The second thermal web 226 is unwound from the second unused thermal material roll 225 located on the second thermal web unwinder 220 and is fed to the second thermal transfer printhead 60. The second thermal transfer printhead 60 uses the second thermal web 226 to print the data inputted by the operator onto the unprinted two-layer price tag web 77 moving through the second thermal transfer printhead 60 to create a printed two-layer price tag web 79. The second thermal material web 226 exits from the second thermal transfer printhead 60 and is collected on the second thermal web rewinder 250 as the second used thermal material roll 255.

Upon exiting the second thermal transfer printhead 40, the printed two-layer price tag web 79 is directed to the completed product rewinder 270. The completed product rewinder 270 winds the printed two-layer price tag web 79 into a completed two-layer price tag roll 275, thereby completing the manufacturing process. The completed product roll 275 can then be removed from the completed product rewinder 270 and delivered to another facility to allow the two-layer price tags of the completed product roll 275 to be attached to the merchandise by a separate machine.

Figure 4:
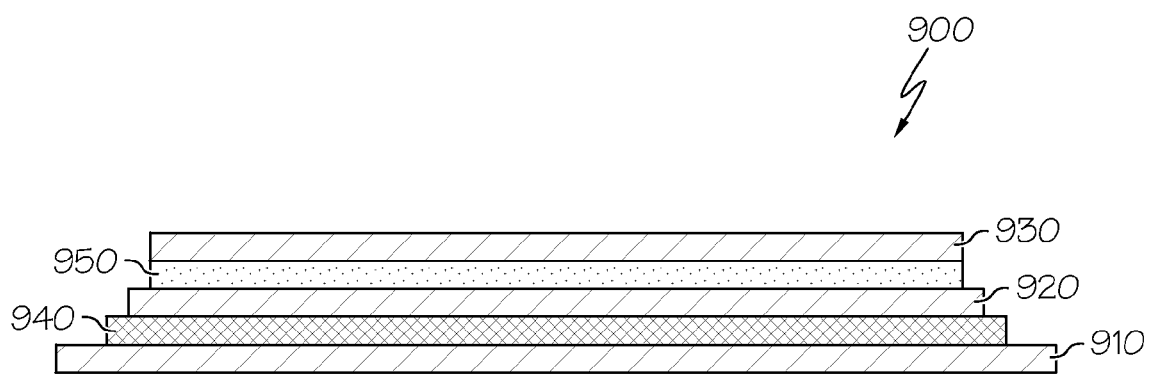
FIG. 4 is a magnified side view of a three-layer price tag manufactured by a first alternative embodiment of the machine of the present invention.

Referring now to FIG. 4, a three-layer price tag 900 is shown. The three-layer price tag 900 has a base layer 910, a secondary layer 920, and a tertiary layer 930. The secondary layer 920 is held to the base layer 910 by a first adhesive layer 940. The tertiary layer 930 is held to the secondary layer 920 by a second adhesive layer 950. Again, both the first and second adhesive layers 940, 950 are preferably composed of a low-stick/non-stick adhesive that loses it's adhesive qualities once the tertiary layer 930 and/or secondary layer 920 has been removed.

Figure 5:
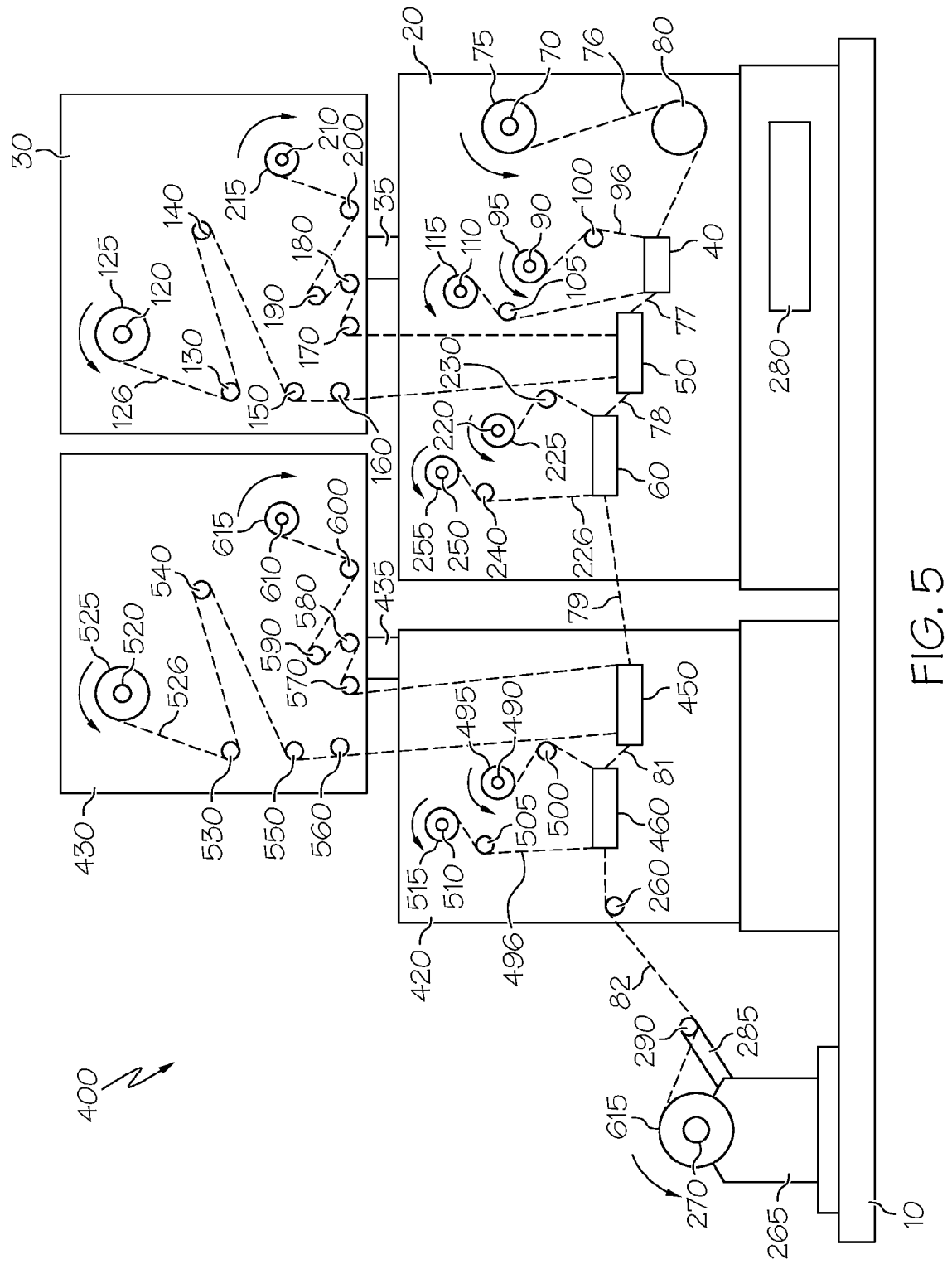
FIG. 5 is a front view of the first alternative embodiment of a machine for manufacturing a multi-layer price tag in accordance with the present invention.

Referring now to FIG. 5, a first alternative embodiment of a machine 400 for manufacturing a multi-layer price tag is shown. In the configuration shown in FIG. 5, the machine 400 is set up to manufacture the three-layer price tag 900. The machine 400 shown in FIG. 5 is identical to the machine 1 shown in FIG. 3, except for the addition of several components that allow the first alternative embodiment of the machine 400 to produce three-layer price tags, as opposed to the exemplary embodiment of the machine 1 that is limited to producing two-layer price tags.

In addition to the components of the machine 1 shown in FIG. 3, the machine 400 shown in FIG. 5 includes a second lower frame 420 attached to the base 10. The second lower frame is positioned to the left of the first lower frame 20. A second support rod 435 is connected to the base 10 behind the second lower frame 420. The second support rod 435 supports a second upper frame 430 partially above both the second lower frame 420 and the lower frame 20.

A second automated label applicator 450 is mounted toward the distal end 6 of the machine 400 on the second lower frame 420. The second automated label applicator 450 is provided with a third label unwinder 520 and a third label rewinder 610. The second automated label applicator 450 is further provided with a plurality of eight automated label applicator idlers 530, 540, 550, 560, 570, 580, 590, 600. The second automated label applicator 450, the third label unwinder 520, the third label rewinder 610, and the eight automated label applicator idlers 530, 540, 550, 560, 570, 580, 590, 600 are mounted on the second lower frame 420 and second upper frame 430 in the exact same manner as how the first automated label applicator 50 and all the components associated with the first automated label applicator 50 are mounted to the first lower frame 20 and first upper frame 30.

A third thermal transfer printhead 460 is mounted to the second lower frame 420 to the left of the second automated label applicator 450. The third thermal transfer printhead 460 is provided with a third thermal web unwinder 490 and a third thermal web rewinder 510. The third thermal transfer printhead 460 is further provided with a fifth thermal web idler 500 and a sixth thermal web idler 505. The third thermal transfer printhead 460, third thermal web unwinder 490, third thermal material rewinder 510, fifth thermal web idler 500, and sixth thermal web idler 505 are mounted on the second lower frame 420 in the exact same manner as the second thermal transfer printhead 60 and all the components associated with the second thermal transfer printhead 60 are mounted on the first lower frame 20.

The secondary frame 265 is mounted to the base 10, and is spaced a short distance away from the second lower frame 20 toward the proximal end 5 of the machine 400. The second label idler 260 is mounted to second lower frame 420 and is positioned between the secondary frame 265 and the third thermal transfer printhead 460. The completed product rewinder 270 and the third label idler 290 remain mounted on the secondary frame 265 in the same manner as the machine 1 shown in FIG. 3.

Having now described the layout of the machine 400 for manufacturing three-layer price tags, the operation of the machine 400 will now be explained. As discussed above in relation to the exemplary embodiment of the machine 1, the first alternative embodiment of the machine 400 must be prepped before it is operated. Along with the steps required to prep the machine 1 for manufacturing two-layer price tags, the machine 400 for manufacturing three-layer price tags requires the additional steps of loading the third label unwinder 520 with a third unused label roll 525, and the third thermal web unwinder 490 with a third unused thermal material roll 495. The third unused label roll 525 and the third unused thermal web roll 495 must then be fed through the appropriate parts of the machine 400 using the same procedure discussed above in relation to the machine 1 shown in FIG. 3. In the first alternative embodiment of the machine 400, the base layer web 76 take a path similar to the path shown in the exemplary embodiment of the machine 1, except that the base layer web 76 is additionally fed through the second automated label applicator 450 and the third thermal transfer printhead 460 before being directed to the completed product rewinder 270.

Once the machine 400 has been prepped, manufacture of three-layer price tags can begin. The base layer roll 75 is unwound from the base label unwinder 70 to create the base layer web 76. The base layer web 76 moves through the first thermal transfer printhead 40, the first automated label applicator 50, and the second thermal transfer printhead 60 to create a printed two-layer price tag web 79. Once the printed two-layer price tag web 79 exits from the second thermal transfer printhead 60, it is directed to the second automated label applicator 450. The second automated label applicator 450 applies a plurality of third layer labels to the two-layer price tag web 79 to create an unprinted three-layer price tag web 81. The plurality of third layer labels are provided from a third label web 526 that unwinds from the unused third label roll 525. The used third label web 526 is wound into a used third layer roll 615 on the second automated price tag rewinder 610.

The unprinted three-layer price tag web 81 is then directed into the third thermal transfer printhead 460. The third thermal transfer printhead 460 uses a third thermal web 496 created by the unwinding of the third unused thermal material roll 495 on the third thermal web unwinder 490 to print the data inputted by the operator onto the unprinted three-layer price tag web 81 to create a printed three-layer price tag web 82. The used thermal web 496 is wound into a used thermal material roll 515 on the third thermal web rewinder 510.

The printed three-layer price tag web 82 is directed to the completed product rewinder 270 once the printed three-layer price tag web 82 exits from the third thermal transfer printhead 460. The completed product rewinder 270 winds the printed three-layer price tag web 82 into a completed three-layer price tag roll 675, thereby completing the manufacturing process.

It is contemplated that operator may use the user interface 280 to command the first alternative embodiment of the machine 400 to produce price tags having only two layers instead of three layers. Commanding the machine 400 to produce two-layer price tags would cause the machine 400 to deactivate the second automated label applicator 450 and the third thermal transfer printhead 460, thereby setting the machine 400 in a two-layer price tag mode. In the two-layer price tag mode, the printed two-layer price tag web 78 exits from the second thermal transfer printhead 60 and is directed into the second automated label applicator 450 and subsequently the third thermal transfer printhead 460. However, because the second automated label applicator 450 and the third thermal transfer printhead 460 have been deactivated, passing the printed two-layer price tag web 78 through the second automated label applicator 450 and the third thermal transfer printhead 460 does nothing to change the structure or nature of the printed two-layer price tag web 78.

Furthermore, it is contemplated that the basic design and layout of the exemplary embodiment of the machine 1 could be modified to manufacture price tags having greater than three layers. To achieve this goal, the resulting machine would require as many additional automated label applicators, thermal transfer printheads, and all the components associated with each of these devices as would be necessary to create the desired amount of layers. For example, if a six-layer price tag were desired, the machine would require five automated label applicators and six thermal transfer printheads. As discussed above, such a machine could also easily be commanded to manufacture price tags having less than six layers.

Figure 6:
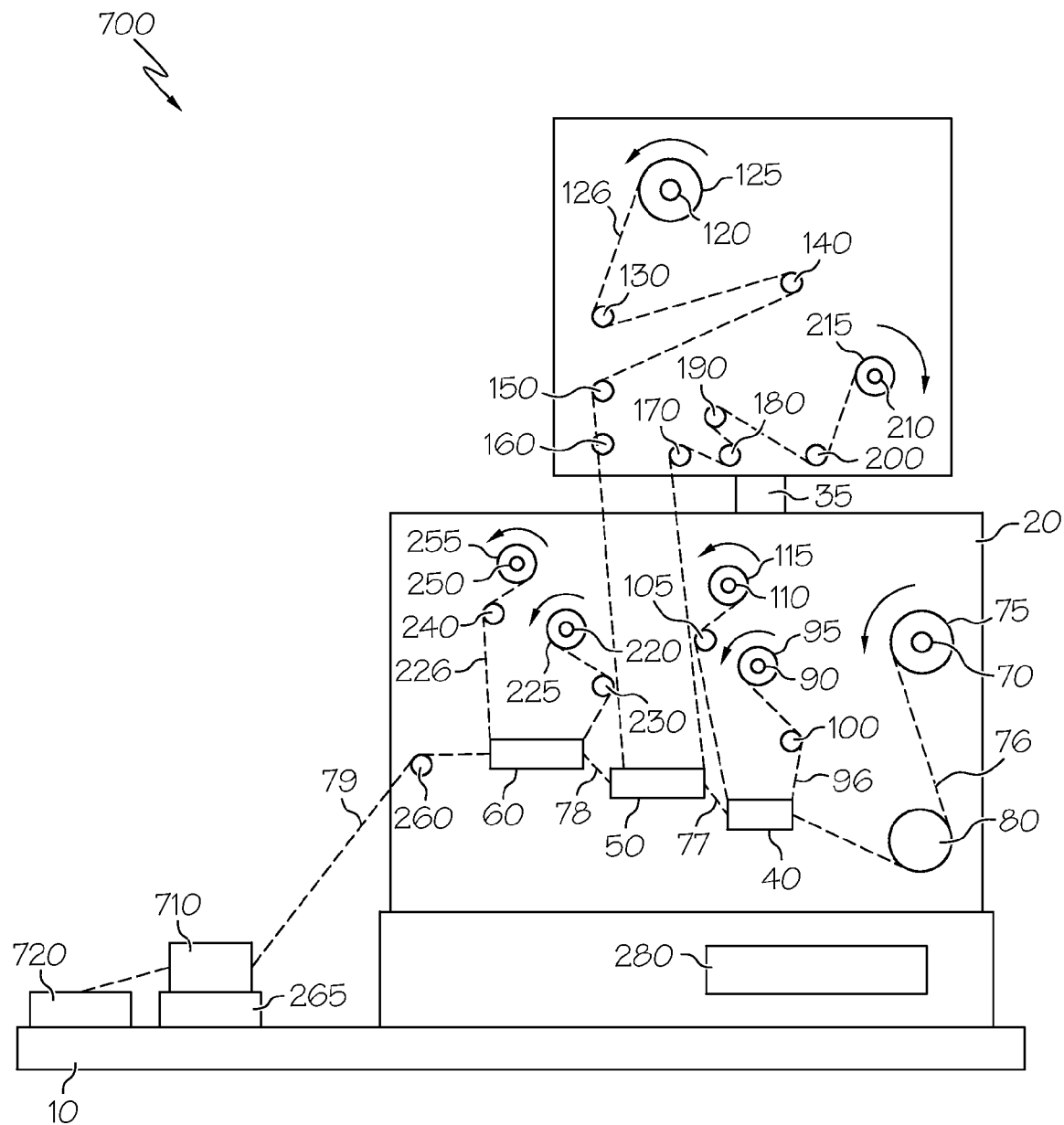
FIG. 6 is a front view of a second alternative embodiment of a machine for manufacturing a multi-layer price tag in accordance with the present invention.

Referring now to FIG. 6, a second alternative embodiment of a machine 700 for manufacturing a multi-layer price tag is shown. In the configuration shown in FIG. 5, the machine 700 is set up to produce separate, individual price tags having two layers. The second alternative embodiment of the machine 700 is substantially similar to the exemplary embodiment of the machine 1. However, the second alternative embodiment of the machine 700 replaces the completed product rewinder 270 and the third label idler 290 with an automated price tag cutter 710 and a collection bin 720. Furthermore, the second alternative embodiment of the machine does not have a third label idler arm 285 or a third label idler 290. The automated price tag cutter 710 is mounted to the secondary frame 265. The collection bin 720 is located adjacent to the automated price tag cutter 710 and is mounted to the base 10.

In operation, the second alternative embodiment of the machine 700 operates identically to the exemplary embodiment of the machine 1. The base label unwinder 70 unwinds the base layer roll 75 to create the base layer web 76. The base layer web moves through the machine 1 to the first thermal transfer printhead 40, the first automated label applicator 50, and the second thermal transfer printhead 60 to create the printed one-layer price tag web 77, the unprinted two-layer price tag web 78, and the printed two-layer price tag web 79, respectively.

However, the completed two-layer price tag web 79 is directed to the automated price tag cutter 710 once the completed two-layer price tag web 79 exits from the second thermal transfer printhead 60. The automated price tag cutter 710 cuts the printed two-layer price tag web 79 to separate the continuous string of completed two-layer price tags into a plurality of single, individual two-layer price tags. The single, individual two-layer price tags are discharged from the automated price tag cutter 710 and into the collection bin 720 where the single, individual two-layer price tags can be delivered to a retail store and be manually attached to the appropriate merchandise.

It is contemplated that the second alternative embodiment of the machine 700 may be combined with the first alternative embodiment of the machine 500 to create a machine capable of producing separate, individual price tags having three layers.

While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A method of manufacturing a multi-layer price tag roll comprising the steps of:
    providing a machine having a base, a frame, a secondary frame, an unwinder, at least two printers, at least one automated label applicator, and a rewinder;
    providing a plurality of base layer of labels on a base label roll, mounting said base label roll on said unwinder;
    unwinding said base label roll from said unwinder to create a base label web;
    printing a first information layer on said base label web using one of said at least two printers to create a printed one-layer price tag web, the first information layer including a first price;
    applying a second layer of labels to said printed one-layer price tag web using said at least one automated label applicator to create multi-layer price tag web with a second unprinted layer, the second unprinted layer concealing the first information layer;
    printing a second information layer on said unprinted layer of the multi-layer price tag web using another one of said at least two printers to create a completed multi-layer price tag web, the second information layer including a second price;
    rewinding said completed mutli-layer price tag web onto said rewinder to create a multi-layer price tag roll; and
    wherein the first price and the second price are different and wherein said at least two printers have thermal transfer printheads.

2. The method of claim 1, wherein said at least one automated label applicator utilizes a low-stick adhesive in the step of applying.

3. The method of claim 1, wherein said at least one automated label applicator utilizes a non-stick adhesive in the step of applying.

4. The method of claim 1, wherein said second layer of labels have a dimension slightly smaller than that of said base layer labels.

5. The method of claim 1, wherein the second price has a higher monetary value than the first price.

6. The method of claim 2, wherein the low-stick adhesives include removable adhesives, repositionable adhesives, low tack adhesives, frangible adhesives, and static adhesives.

7. The method of claim 1, where the first information layer is provided with variable information.

8. The method of claim 1, including a further step of applying a third layer of labels to said printed one-layer price tag web over said second layer using said at least one automated label applicator to create a multi-layer price tag web with a third unprinted layer after the step of applying the second layer.

9. The method of claim 8, including a further step of applying a fourth layer of labels to said printed one-layer price tag web over said third layer using said at least one automated label applicator to create a multi-layer price tag web with a fourth unprinted layer after the step of applying the third layer.

10. The method of claim 1, wherein the second information layer is provided with variable information.

11. The method of claim 7 wherein the variable information includes one or more of the following: a Universal Product Code barcode number of merchandise, a Universal Product Code number of a manufacturer of merchandise, the name of a manufacturer of merchandise, and merchandise size.

12. The method of claim 10 wherein the variable information includes one or more of the following: a Universal Product Code barcode number of merchandise, a Universal Product Code number of a manufacturer of merchandise, the name of a manufacturer of merchandise, and merchandise size.

13. The method of claim 8 including a further step of printing a third information layer on the third unprinted layer of the multi-layer price tag web using an additional printer to create a completed multi-layer price tag web.

14. The method of claim 13 wherein the printer is a thermal transfer printer.

15. The method of claim 9 including a further step of printing a fourth information layer on said unprinted fourth layer of the multi-layer price tag web using an additional printer to create a completed multi-layer price tag web.

16. The method of claim 15 wherein the printer is a thermal transfer printer.

17. The method of claim 13, wherein the second information layer is provided with variable information.

18. The method of claim 17 wherein the variable information includes one or more of the following: a Universal Product Code barcode number of merchandise, a Universal Product Code number of a manufacturer of merchandise, the name of a manufacturer of merchandise, and merchandise size.

19. The method of claim 15, wherein the third information layer is provided with variable information.

20. The method of claim 19, wherein the variable information includes one or more of the following: a Universal Product Code barcode number of merchandise, a Universal Product Code number of a manufacturer of merchandise, the name of a manufacturer of merchandise, and merchandise size.

\* \* \* \* \*